United States Patent
Iwai et al.

(10) Patent No.: US 10,414,252 B2
(45) Date of Patent: Sep. 17, 2019

(54) DOOR STRUCTURE

(71) Applicant: HONDA MOTOR CO., LTD., Tokyo (JP)

(72) Inventors: Yutaka Iwai, Wako (JP); Sotaro Hashiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/813,462

(22) Filed: Nov. 15, 2017

(65) Prior Publication Data

US 2018/0154742 A1   Jun. 7, 2018

(30) Foreign Application Priority Data

Dec. 6, 2016   (JP) .................................. 2016-237071

(51) Int. Cl.
  *B60J 5/04*   (2006.01)
  *B60J 1/17*   (2006.01)
(52) U.S. Cl.
  CPC .............. *B60J 5/0402* (2013.01); *B60J 1/17* (2013.01); *B60J 5/0408* (2013.01)
(58) Field of Classification Search
  CPC ........... B60J 5/0402; B60J 5/0408; B60J 1/17
  See application file for complete search history.

(56) References Cited

U.S. PATENT DOCUMENTS

| | | | | |
|---|---|---|---|---|
| 2,449,210 A | * | 9/1948 | Faust | B60J 5/0402 49/374 |
| 2004/0130179 A1 | * | 7/2004 | Masunaga | B60J 5/0402 296/146.5 |
| 2005/0044796 A1 | * | 3/2005 | Kim | B60J 1/17 49/374 |
| 2006/0181107 A1 | * | 8/2006 | Nishikawa | B60J 5/0402 296/146.2 |
| 2012/0091751 A1 | * | 4/2012 | Zimmer | B60J 5/0402 296/146.9 |
| 2012/0192498 A1 | * | 8/2012 | Fukui | B60J 5/0402 49/504 |
| 2017/0210215 A1 | * | 7/2017 | Clark | B60J 10/74 |
| 2018/0117997 A1 | * | 5/2018 | Otake | B60J 5/0402 |

FOREIGN PATENT DOCUMENTS

JP   S59-230823 A   12/1984
JP   5377125 B2   10/2013

OTHER PUBLICATIONS

Office Action dated Apr. 27, 2018, in Japanese Patent Application No. 2016-237071, with partial English translation.

* cited by examiner

*Primary Examiner* — Gregory J Strimbu
(74) *Attorney, Agent, or Firm* — Thomas | Horstemeyer, LLP

(57) ABSTRACT

A door structure that supports a door glass of a door of a vehicle includes a sash and a run channel that guides the door glass, and a bracket on an inner panel of the door and supports the sash. The sash includes a groove that holds the run channel. The bracket includes a regulating portion that projects from an outside of the groove to an inside of the groove and holds the run channel in the groove.

9 Claims, 7 Drawing Sheets

DOOR STRUCTURE

CROSS-REFERENCE TO RELATED APPLICATION

This application is based upon and claims the benefit of priority from the prior Japanese Patent Application No. 2016-237071, filed on Dec. 6, 2016, the entire contents of which are incorporated herein by reference.

BACKGROUND OF THE INVENTION

Field of the Invention

The present invention relates to the door structure of a vehicle.

Description of the Related Art

As a door structure that guides the door glass of a vehicle movably in the vertical direction, a structure that guides the door glass by a sash through a run channel is known. If the run channel drops from the sash, a problem is posed in guiding the door glass. Japanese Patent No. 5377125 (patent literature 1) discloses a structure that provides bending portions bending inward on both side walls of the groove of a sash and locks a run channel so it does not drop from the sash.

In the structure that provides the bending portions on both side walls of the groove of the sash, as in Japanese Patent No. 5377125, if the bending portions are provided over the entirety of the sash in the longitudinal direction, the degree of design freedom of the sash lowers. If the bending portions are locally provided, the manufacturing cost of the sash increases.

SUMMARY OF THE INVENTION

It is an object of the present invention to, when preventing dropping of a run channel, improve the degree of design freedom of a sash while suppressing an increase in manufacturing cost.

According to an aspect of the present invention, there is provided a door structure that supports a door glass of a door of a vehicle, comprising: a sash that guides the door glass through a run channel; and a bracket that is provided on an inner panel of the door and supports the sash, wherein the sash includes a groove that holds the run channel, and the bracket includes a regulating portion that projects from an outside of the groove to an inside and regulates dropping of the run channel from the groove.

Further features of the present invention will become apparent from the following description of exemplary embodiments (with reference to the attached drawings).

DESCRIPTION OF THE EMBODIMENTS

Figure 1:
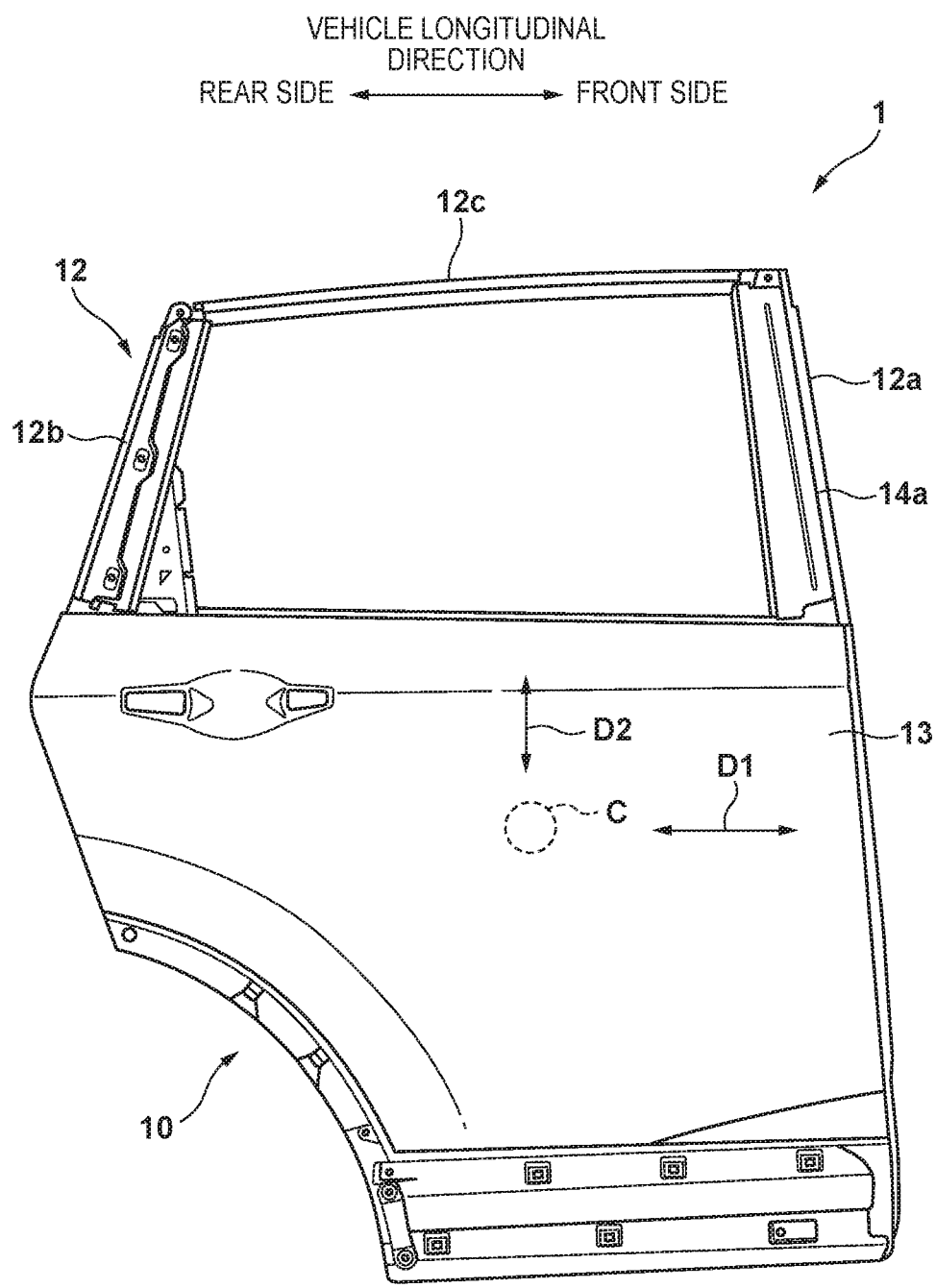
FIG. 1 is a view showing the outer appearance of a door to which a door structure according to an embodiment is applied.

FIG. 1 is a view showing the outer appearance of a vehicle door 1 to which a door structure according to an embodiment of the present invention is applied. The door 1 according to this embodiment is an example of the door on the rear right side of a four-wheeled vehicle. However, the present invention is also applicable to the door of any other portion including a tailgate. The vehicle longitudinal direction and the vehicle width direction in the drawings represent the directions of the four-wheeled vehicle including the door 1. Additionally, in this specification, both the direction of an arrow D1 and the direction of an arrow D2 will sometimes be referred to as a door inward/outward direction. The door inward/outward direction is a direction that defines the outward/inward direction with respect to a center C of plane of the door 1 defined as inside and the peripheral edge of the door 1 defined as outside. The direction D1 is particularly a direction parallel to the vehicle longitudinal direction, and the direction D2 is particularly a direction parallel to a vertical direction.

The door 1 includes a door lower portion 10 and a door upper portion 12 in which a window opening 11 is formed. The door lower portion 10 includes an outer panel 13 serving as the exterior. A lower garnish is mounted on the lower portion of the door lower portion 10. FIG. 1 shows a state in which the lower garnish is detached. The rear portion of the door lower portion 10 has an arc notch conforming to the wheel house shape of a rear wheel.

The window opening 11 is opened/closed by a door glass (not shown in FIG. 1). When the window opening 11 is fully opened, most of a door glass G is stored in the door lower portion 10. The door upper portion 12 includes a columnar portion 12a on the front side, a columnar portion 12b on the rear side, and a beam portion 12c disposed between the upper portions of the columnar portions 12a and 12b. The window opening 11 is defined by the portions 12a to 12c and the upper edge of the door lower portion 10. The columnar portion 12a includes an outer panel 14 serving as the exterior. An outer panel is mounted on the columnar portion 12b as well. FIG. 1 shows a state in which the outer panel is detached.

Figure 2:
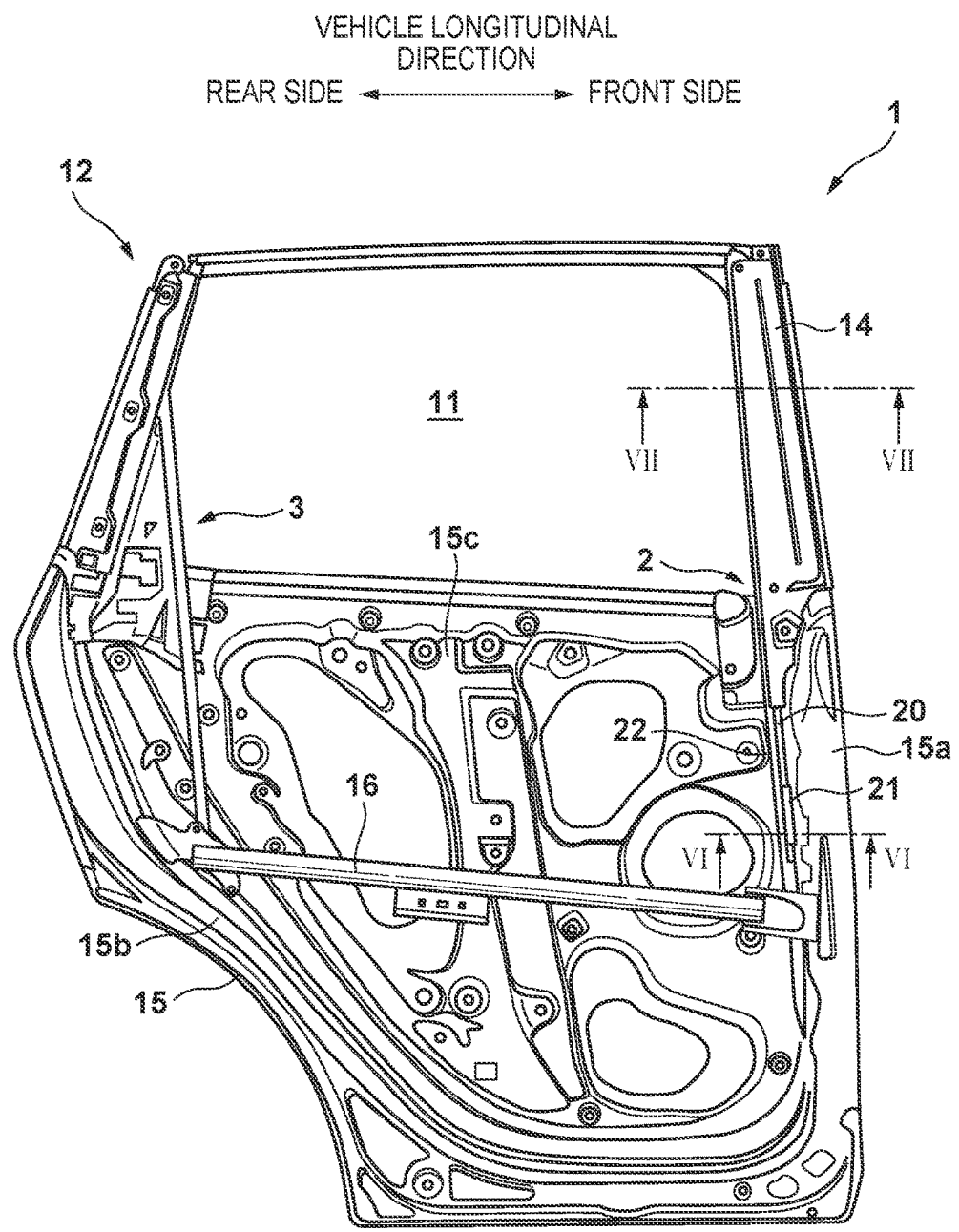
FIG. 2 is a view showing a state in which some outer panels are detached from the door shown in FIG. 1.

FIG. 2 will be referred to in addition to FIG. 1. FIG. 2 is a view showing the door 1 in a state in which the electric power window mechanism of the door glass and the like, which are stored in the outer panel 13 and the door lower portion 10, are detached. The door 1 includes an inner panel 15. The inner panel 15 forms the interior of the door lower portion 10 and the door upper portion 12. In the door lower portion 10, the inner panel 15 includes a front wall portion 15a, a rear wall portion 15b, and a side wall portion 15c. The front wall portion 15a is a wall portion extending in the vehicle width direction and the vertical direction on the front side in the vehicle longitudinal direction. The rear wall portion 15b is a wall portion extending in the vehicle width direction and the vertical direction on the rear side in the vehicle longitudinal direction. The side wall portion 15c is a wall portion extending in the vehicle longitudinal direction and the vertical direction. A reinforcing member 16 extending in the vehicle longitudinal direction is connected between the front wall portion 15a and the rear wall portion 15b.

The door 1 includes a guide structure 2 disposed across the columnar portion 12a from the front wall portion 15a, and a guide structure 3 disposed across the columnar portion 12b from the rear wall portion 15b. The guide structures 2 and 3 are structures that support the door glass and guide the vertical movement of the door glass. The guide structure 2 guides the front side portion of the door glass, and the guide structure 3 guides the rear side portion of the door glass. The guide structure 2 will be described below in detail. The same arrangement can be employed for the guide structure 3 as well.

Figure 3:
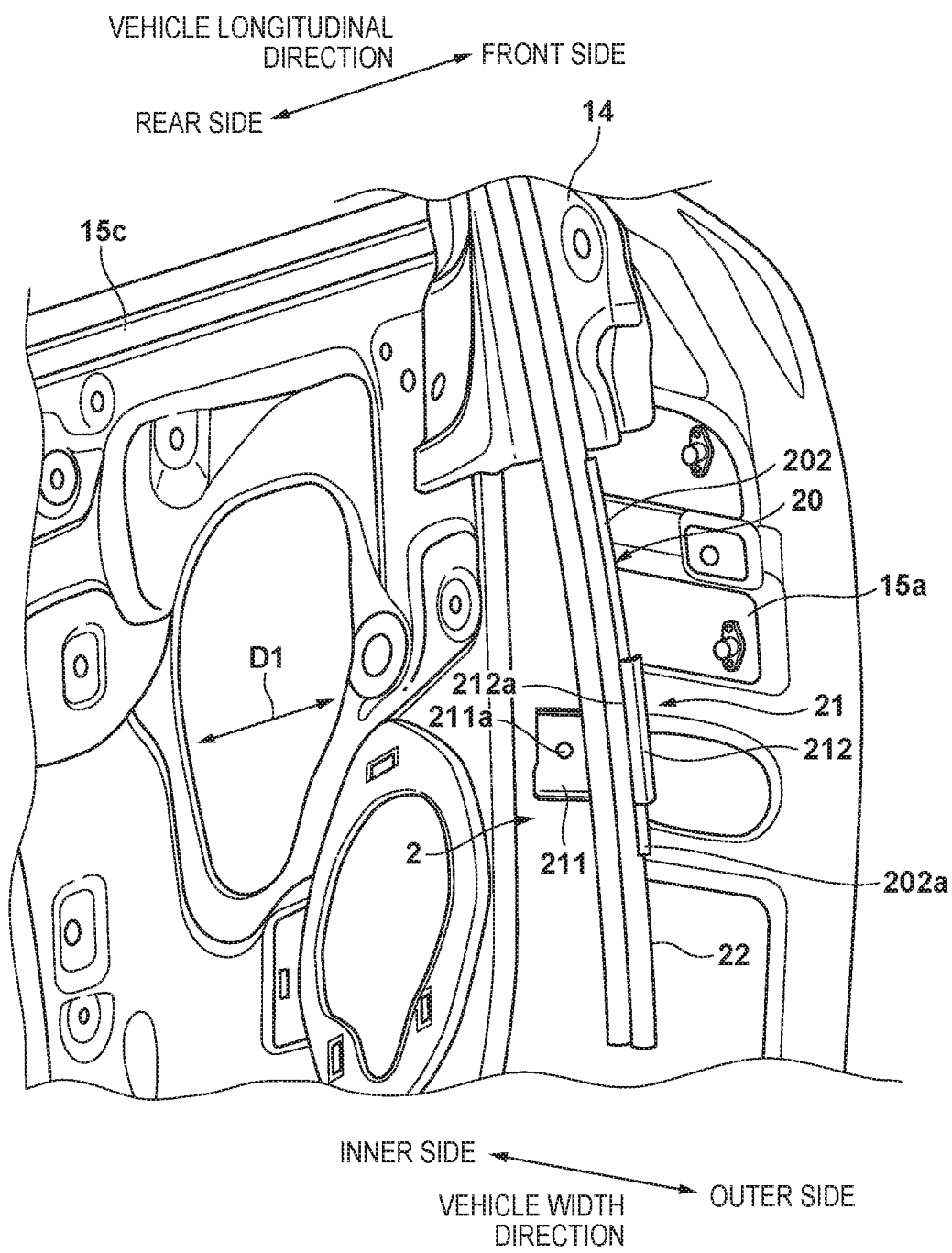
FIG. 3 is a view showing part of the internal structure of the door shown in FIG. 1.

FIG. 3 will be referred to in addition to FIG. 2. FIG. 3 shows the guide structure 2 near the front wall portion 15a. The guide structure 2 includes a sash 20, a bracket 21, and a run channel 22. The sash 20 and the run channel 22 extend from the door lower portion 10 to the columnar portion 12a. The door glass is guided by the sash 20 through the run channel 22. The bracket 21 is provided in the door lower portion 10 and fixed to the front wall portion 15a of the inner panel 15. On the door lower portion 10, the sash 20 is supported on spots through the bracket 21. On the columnar portion 12a, the sash 20 is continuously supported over the entirety of the inner panel 15 and the outer panel 14 in the vertical direction.

Figure 4:
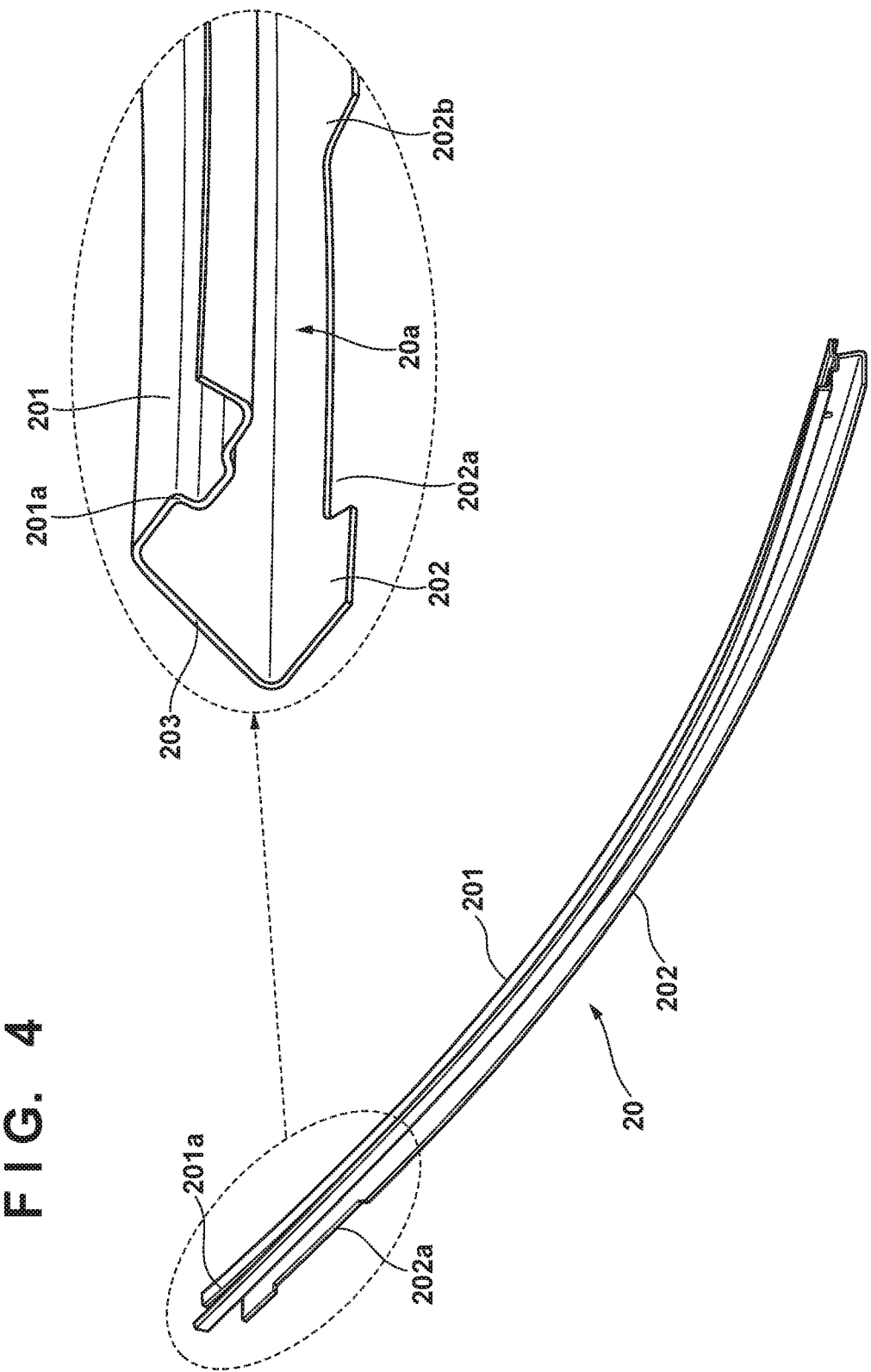
FIG. 4 shows a perspective view and a partial detail drawing of a sash.

FIG. 4 shows a perspective view of the sash 20 and details of an end (the lower end of the sash 20 mounted in the vehicle). The sash 20 is a long member having a U-shaped section that forms a groove 20a. The sash 20 includes a side wall 201, a side wall 202, and a bottom wall 203, which form the groove 20a. The side wall 201 rises from one end of the bottom wall 203 in the width direction, and the side wall 202 rises from the other end of the bottom wall 203 in the width direction. The side wall 201 and the side wall 202 face each other and extend in parallel to each other as a whole. In the side wall 201, a plurality of bending portions including a bending portion 201a are formed over the entirety of the side wall 201 in the longitudinal direction. The bending portion 201a bends to the inner side of the groove 20a. The side wall 202 has no bending portion and is formed flat over its entirety in the longitudinal direction. At the lower end of the sash 20, a notch portion 202a is formed in the side wall 202. The height from the bottom wall 203 is lower in the notch portion 202a than in the other portions.

Figure 5A:
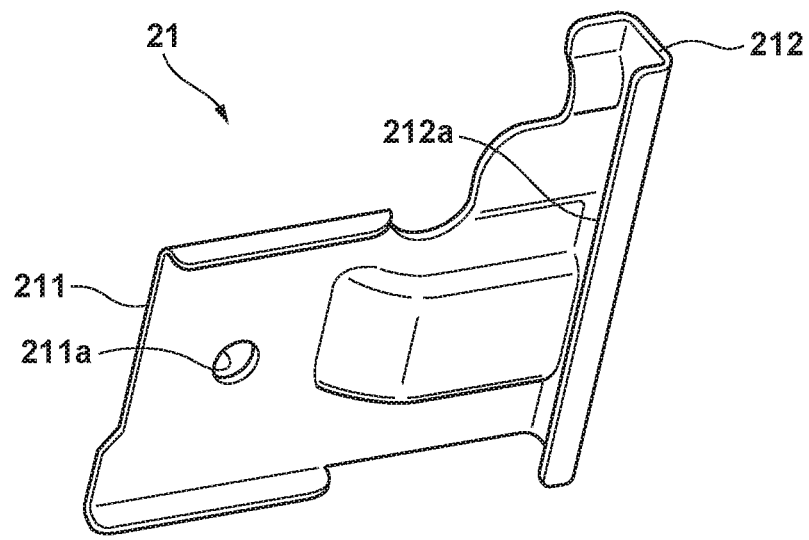
FIGS. 5A and 5B are perspective views of a bracket.
Figure 5B:
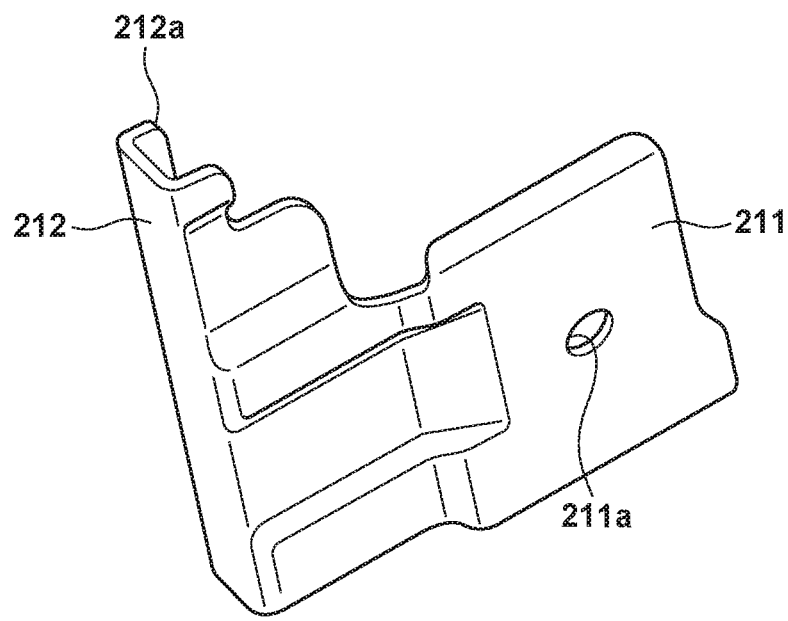

FIGS. 5A and 5B are perspective views of the bracket 21 viewed from different viewpoints. The bracket 21 integrally includes an attachment portion 211 and a holding portion 212. The attachment portion 211 is a portion fixed to the front wall portion 15a. The attachment portion 211 includes an attachment hole 211a, and can be fastened to the front wall portion 15a by inserting a bolt into the attachment hole 211a. The fixing method may be welding or the like in place of fastening. The holding portion 212 has a U-shaped section and wraps and holds the sash 20. Holding of the sash 20 is done by, for example, welding to the holding portion 212. The holding portion 212 includes a regulating portion 212a at an end. The regulating portion 212a regulates dropping of the run channel 22.

Figure 6:
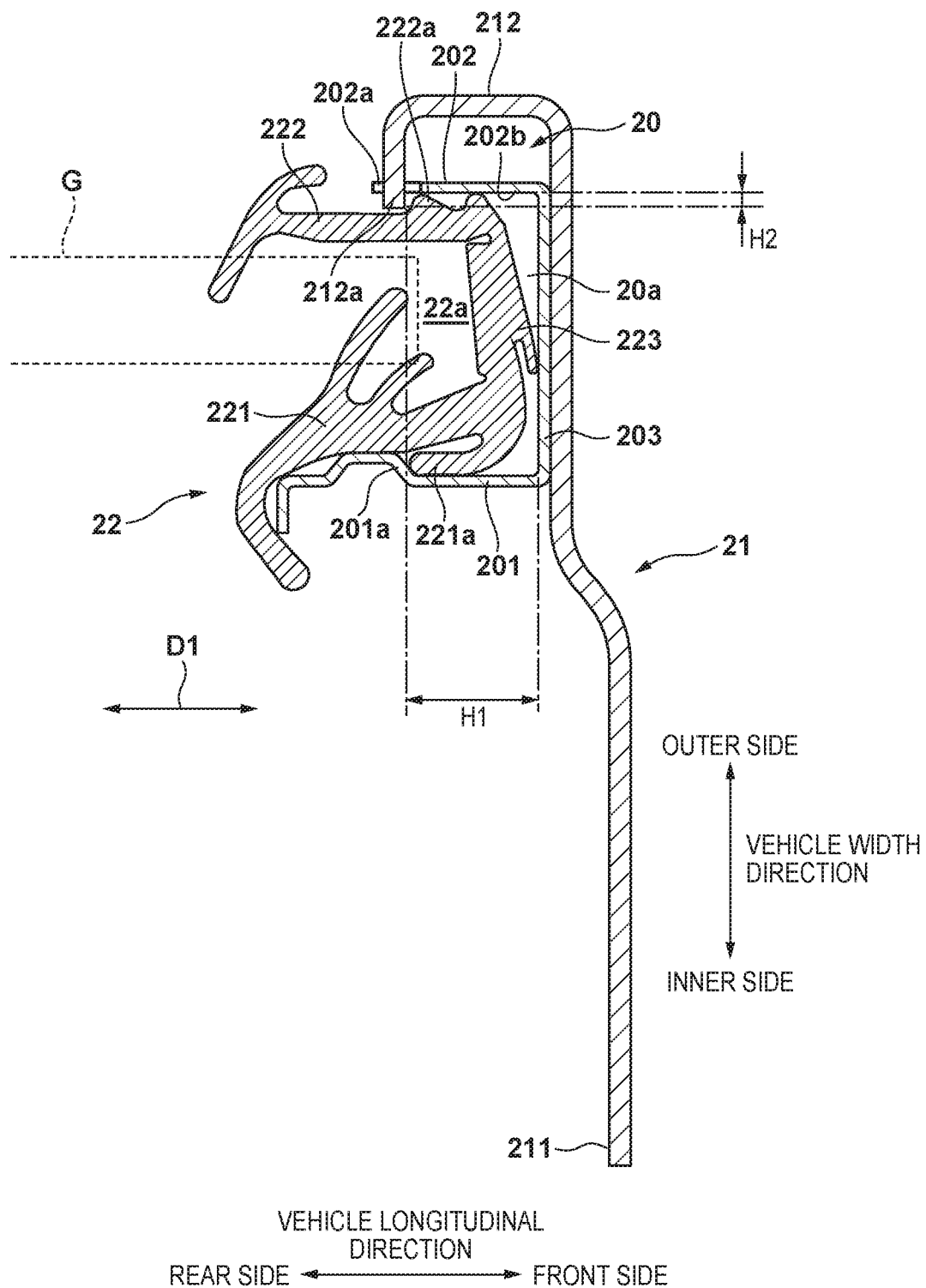
FIG. 6 is a sectional view taken along a line VI-VI in FIG. 2.

The run channel 22 and its dropping preventing structure will be described with reference to FIG. 6. FIG. 6 is a sectional view taken along a line VI-VI in FIG. 2. The run channel 22 is a long member having a U-shaped section that forms a groove 22a in which an end of the door glass G is inserted. The sectional shape is substantially the same over its entirety in the longitudinal direction. The run channel 22 is made of an elastic material such as rubber. The run channel 22 is always in contact with the door glass G to allow it to smoothly move in the vertical direction, and also forms a seal for the door glass G.

The run channel 22 includes a side portion 221, a side portion 222, and a bottom portion 223, which form the groove 22a opening to the inner side in the door inward/outward direction D1. The side portion 221, the side portion 222, and the bottom portion 223 are inserted into the groove 20a of the sash 20 so as to come into contact with the side wall 201, the side wall 202, and the bottom wall 203 of the sash 20, respectively. A plurality of lips are formed on the run channel 22. The plurality of lips include a lip 221a integrally formed on the side portion 221, and a lip 222a integrally formed on the side portion 222.

The bending portion 201a of the side wall 201 of the sash 20 is located on the inner side in the door inward/outward direction D1 with respect to the lip 221a. Hence, if the run channel 22 is displaced to the inner side in the door inward/outward direction D1, the bending portion 201a abuts against the lip 221a to prevent the displacement. Dropping of the run channel 22 is thus regulated.

The regulating portion 212a of the bracket 21 projects from the outside of the groove 20a to the inside over the side wall 202, and is located on the inner side in the door inward/outward direction D1 with respect to the lip 222a. Hence, if the run channel 22 is displaced to the inner side in the door inward/outward direction D1, the regulating portion 212a abuts against the lip 222a to prevent the displacement. Dropping of the run channel 22 is thus regulated.

As described above, when the bracket 21 is used as the dropping preventing member for the run channel 22, the structure on the side of the sash 20 aiming at preventing dropping can be simplified. That is, in this embodiment, a structure corresponding to the bending portion 201a is not formed on the side wall 202, and the side wall 202 is flat. The manufacturing cost of the sash 20 tends to increase in proportion to the number of bending portions. The cost can be reduced from this viewpoint. In addition, since the bracket 21 itself is necessary to support the sash 20, the number of parts is not increased.

The regulating portion 212a passes through the notch portion 202a and thus projects from the outside of the groove 20a to the inside over the side wall 202. The notch portion 202a is not essential. However, when the notch portion 202a is formed, the regulating portion 212a can project to a lower position on the side of the bottom wall 203 while making the side wall 202 relatively high, and the position of the regulating portion 212a can be adjusted. If the sash is displaced in the longitudinal direction with respect to the bracket 21, the edge of the notch portion 202a abuts against the edge of the holding portion of the bracket 21 to prevent the displacement. Hence, the notch portion 202a also functions as a longitudinal-direction positioning structure for the sash 20. Note that a slit-shaped opening with a closed periphery may be formed in the side wall 202 in place of the notch portion 202a.

The regulating portion 212a and the bending portion 201a are disposed at positions facing in the vehicle width direction. As for the height from the bottom wall 203, they are located at positions of the same height H1. The height H1 is the height from the bottom wall 203 to the regulating portion 212a and the bending portion 201a in the door inward/outward direction D1, or the height in the normal direction of the bottom wall 203. Since the regulating portion 212a and the bending portion 201a hold such a positional relationship, if a load to drop the run channel 22 to the inner side in the door inward/outward direction D1 acts on the run channel 22, the drop regulation by the regulating portion 212a and the bending portion 201a acts on the left and right sides of the run channel 22 in balance. For example, if the regulating portion 212a and the bending portion 201a are arranged while being shifted in the door inward/outward direction D1, the load may unevenly act on one of the dropping regulating structures. This may induce a twist of the run channel 22 and degrade the dropping preventing effect. The positional relationship according to this embodiment can reduce the twist to the run channel 22 and enhance the dropping preventing effect.

Figure 7:
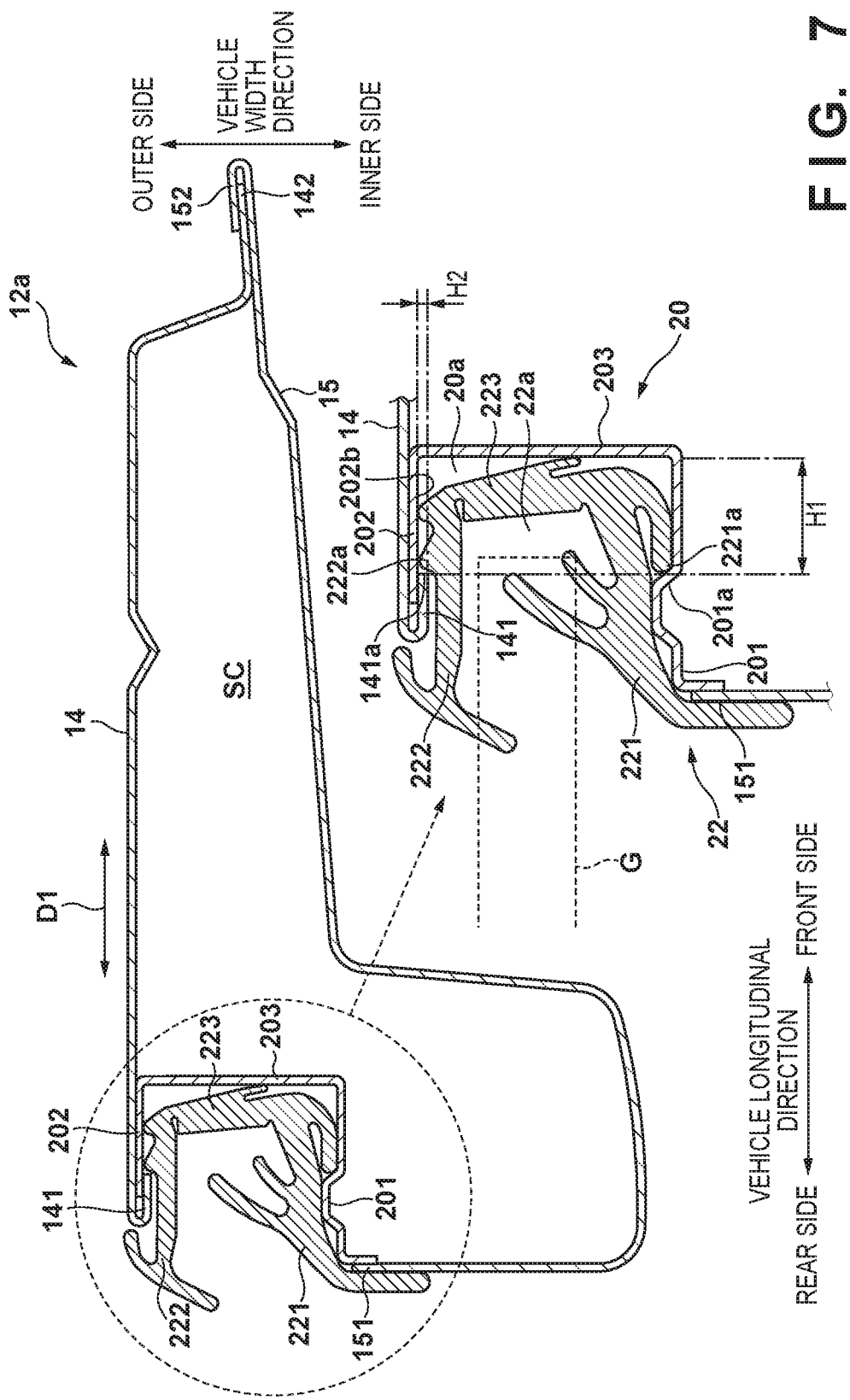
FIG. 7 is a sectional view taken along a line VII-VII in FIG. 2.

The dropping preventing structure and the like of the run channel 22 in the columnar portion 12a will be described with reference to FIG. 7. FIG. 7 shows a sectional view taken along a line VII-VII in FIG. 2, and a partial enlarged view. Since the bracket 21 is arranged in the door lower portion 10, it cannot be used to prevent dropping of the run channel 22 in the door upper portion 12. In this embodiment, dropping of the run channel 22 in the door upper portion 12 is prevented using the outer panel 14.

The sash 20, the outer panel 14, and the inner panel 15 are joined to each other to form a closed section SC. More specifically, an end (folded portion) 141 of the outer panel 14 on the inner side in the door inward/outward direction D1 is joined to the side wall 202 of the sash 20. An end 142 on the outer side is joined to an outer end (folded portion) 152 of the inner panel 15 in the door inward/outward direction D1. An end 151 of the inner panel 15 on the inner side in the door inward/outward direction D1 is joined to the side wall 201 of the sash 20.

The folded portion 141 is folded into a U shape to sandwich the end of the side wall 202 by hemming. The folded portion 152 is folded into a U shape to sandwich the end 142 of the outer panel 14 by hemming.

An edge 141a of the folded portion 141 forms a step to the notch portion 202a. Dropping of the run channel 22 is regulated by the step. That is, the edge 141a is located on the inner side in the door inward/outward direction D1 with respect to the lip 222a. If the run channel 22 is displaced to the inner side in the door inward/outward direction D1, the edge 141a abuts against the lip 222a to prevent the displacement. When the outer panel 14 is used as the dropping preventing member for the run channel 22, the structure on the side of the sash 20 aiming at preventing dropping can be simplified.

The edge 141a and the bending portion 201a are disposed at positions facing in the vehicle width direction. As for the height from the bottom wall 203, they are located at positions of the same height H1. The height H1 is the height from the bottom wall 203 to the edge 141a and the bending portion 201a in the door inward/outward direction D1, or the height in the normal direction of the bottom wall 203. Since the edge 141a and the bending portion 201a hold such a positional relationship, if a load to drop the run channel 22 to the inner side in the door inward/outward direction D1 acts on the run channel 22, the drop regulation by the edge 141a and the bending portion 201a acts on the left and right sides of the run channel 22 in balance, as described concerning the positional relationship between the regulating portion 212a and the bending portion 201a.

The step by the edge 141a has a height H2 with respect to an inner surface 202b. The height H2 equals the thickness of the edge 141a. Referring back to FIG. 6, the height of the distal end of the regulating portion 212a and the height of the step are compared. In this embodiment, the height of the distal end of the regulating portion 212a with respect to the inner surface 202b is H2 which equals the height of the step by the edge 141a. Since these heights equal, if a load to drop the run channel 22 to the inner side in the door inward/outward direction D1 acts on the run channel 22, the drop regulation by the regulating portion 212a and the edge 141a acts on the upper and lower sides of the run channel 22 in balance. That is, almost the same holding strength can be held on the upper and lower portions of the run channel 22. This can reduce a shift amount difference generated by the load unevenly acting on the upper and lower portions and enhance the dropping preventing effect.

<Summary of Embodiment>

1. A door structure according to the embodiment is a door structure that supports a door glass (for example, G) of a door (for example, 1) of a vehicle, comprising:

a sash (for example, 20) that guides the door glass through a run channel (for example, 22); and a bracket (for example, 21) that is provided on an inner panel (for example, 15) of the door and supports the sash, wherein the sash includes a groove (for example, 20a) that holds the run channel, and the bracket includes a regulating portion (for example, 212a) that projects from an outside of the groove to an inside and regulates dropping of the run channel from the groove.

According to this embodiment, dropping of the run channel can be prevented by the bracket. When the bracket that supports the sash is used, no new part need be added, and the structure is simple. Hence, when preventing dropping of the run channel, it is possible to improve the degree of design freedom of the sash while suppressing an increase in manufacturing cost.

2. In the door structure according to the embodiment, the sash includes a bottom wall (for example, 203), a first side wall (for example, 201), and a second side wall (for example, 202) facing the first side wall, which form the groove, the first side wall includes a bending portion (for example, 201a) that regulates the dropping of the run channel from the groove, the second side wall includes a notch portion (for example, 202a) through which the regulating portion passes, and the regulating portion faces the bending portion.

According to this embodiment, since the regulating portion and the bending portion face each other, if a force to detach the run channel from the sash is applied, uneven concentration of the load to both the regulating portion and the bending portion is reduced, and formation of the starting point of dropping is suppressed.

3. In the door structure according to the embodiment, a height (for example, H1) of the regulating portion from the bottom wall equals a height (for example, H1) of the bending portion from the bottom wall.

According to this embodiment, since the regulating portion and the bending portion face each other, if a force to detach the run channel from the sash is applied, uneven concentration of the load to both the regulating portion and the bending portion is reduced, and formation of the starting point of dropping is suppressed.

4. In the door structure according to the embodiment, an outer panel (for example, 14) of the door includes a folded portion (for example, 141) that is folded to sandwich an end of the second side wall, and an edge (for example, 141a) of the folded portion forms a step to an inner surface (for example, 202a) of the second side wall and regulates the dropping of the run channel from the groove.

According to this embodiment, dropping of the run channel from the sash can be prevented by the step. In addition, the regulating portion of the bracket and the step by the folded portion can be formed without interference between them. The sash can be formed to have almost the same section in the longitudinal direction, and the cost can be reduced.

5. In the door structure according to the embodiment, the sash, the outer panel, and the inner panel are joined to each other to form a closed section (for example, SC).

According to this embodiment, the attachment rigidity of the bracket and the rigidity of the sash itself improve, and the dropping of the run channel can further be prevented.

6. In the door structure according to the embodiment, a height (for example, H2) of a distal end of the regulating portion with respect to the inner surface of the second side wall equals a height (for example, H2) of the step to the inner surface of the second side wall.

According to this embodiment, almost the same holding strength of the run channel can be held on the regulating portion and the step. The load can be prevented from unevenly concentrating, and formation of the starting point of dropping is suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2016-237071, filed Dec. 6, 2016, which is hereby incorporated by reference herein in its entirety.

What is claimed is:

1. A door structure that supports a door glass of a door of a vehicle, comprising:
   a sash that holds a run channel that guides the door glass; and
   a bracket that is provided on an inner panel of the door and supports the sash,
   wherein the sash includes a groove that holds the run channel,
   the bracket includes a regulating portion which projects from an outside of the groove to an inside of the groove and holds the run channel in the groove,
   the sash includes a bottom wall, a first side wall, and a second side wall facing the first side wall, the bottom wall and the first and second side walls form the groove,
   the first side wall includes a bending portion that holds the run channel relative to the groove,
   the second side wall includes a notch through which a distal end portion of the regulating portion passes, the distal end portion of the regulating portion being spaced from a base of the notch, and
   the regulating portion faces the bending portion.

2. The structure according to claim 1, wherein a height of the regulating portion from the bottom wall equals a height of the bending portion from the bottom wall.

3. The structure according to claim 1, wherein an outer panel of the door includes a folded portion that is folded to sandwich an end of the second side wall,
   an edge of the folded portion forms a step with respect to an inner surface of the second side wall and holds the run channel in the groove, and
   the run channel includes a lip configured to engage with the step.

4. The structure according to claim 3, wherein the sash, the outer panel, and the inner panel are joined to each other to form a closed section.

5. The structure according to claim 3, wherein a height of a distal end of the distal end portion of the regulating portion with respect to the inner surface of the second side wall equals a height of the step relative to the inner surface of the second side wall.

6. The structure according to claim 1, wherein the base of the notch is spaced a distance from the bottom wall which is less than a distance a distal end of the second side wall is spaced from the bottom wall.

7. The structure according to claim 1, wherein the distal end portion of the regulating portion passes through the notch at a distance from the bottom wall which is less than a distance a distal end of the second side wall is spaced from the bottom wall.

8. The structure according to claim 1, wherein the distal end portion of the regulating portion is parallel with the bottom wall.

9. The structure according to claim 1, wherein the bracket includes a U-shaped holding portion configured to hold the sash,
   the second side wall is flat, and
   the regulating portion forms a side wall of the U-shaped holding portion.

* * * * *